Dec. 1, 1931.   F. DOVE   1,834,607
FLUID MOTOR
Filed May 16, 1930   2 Sheets-Sheet 1

Inventor
Fred Dove
By Brown & Phelps
Attorneys

Dec. 1, 1931.　　　　　F. DOVE　　　　　1,834,607
FLUID MOTOR
Filed May 16, 1930　　2 Sheets-Sheet 2
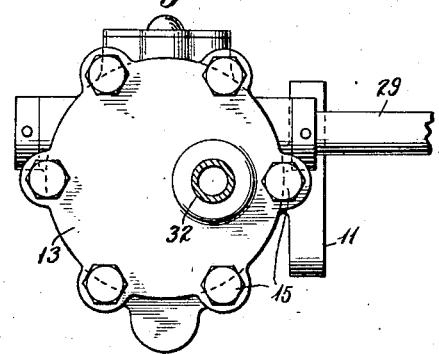
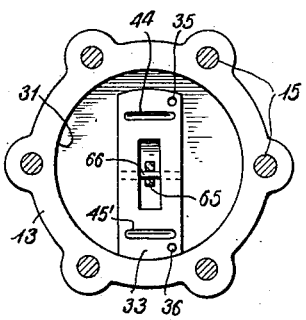
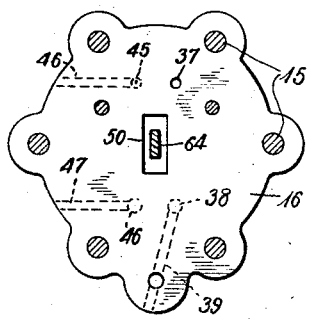
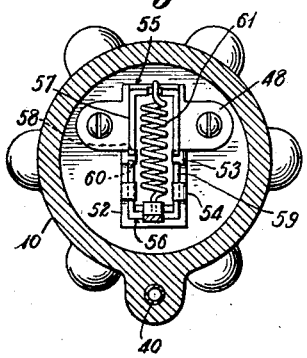
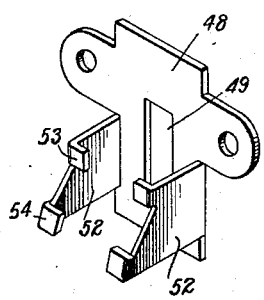
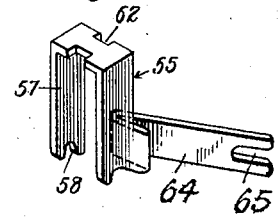
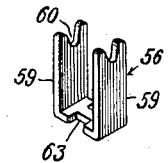
Inventor
Fred Dove
By Brower & Phelps
Attorneys Patented Dec. 1, 1931

1,834,607

UNITED STATES PATENT OFFICE

FRED DOVE, OF ATLANTA, GEORGIA, ASSIGNOR TO S. A. LOVE

FLUID MOTOR

Application filed May 16, 1930. Serial No. 453,054.

This invention relates to a motor of the reciprocating type which is adapted for operation by means of air, steam or any suitable fluid pressure and is primarily designed to operate a windshield wiper on street cars, busses, locomotives, steam ships, automobiles and the like although capable of general use or application.

It is generally aimed to provide an exceedingly simple, durable, and inexpensive construction wherein the parts may be readily constructed and machined and are accessible for inspection, cleaning and repair.

A particular important object is to provide a construction in which a novel plate is fastened at one end of the cylinder between the same and the end closure, which mounts the valve and valve-operating toggle means, and through which the inlet and exhaust of power medium is controlled.

The more specific objects and advantages will become apparent from a consideration of the description following taken in connection with accompanying drawings illustrating one operative embodiment.

In said drawings:—

Figure 3 is a right hand end elevation;

Figure 4 is a cross-sectional view, taken on the line 4—4 of Figure 1;

Figure 5 is a cross-sectional view, taken on the line 5—5 of Figure 1;

Figure 6 is a cross-sectional view, taken on the line 6—6 of Figure 1;

Figure 7 is a detail perspective view of the toggle-mounting bracket;

Figure 8 is a perspective view of the upper toggle section; and

Figure 9 is a perspective view of the lower toggle section.

Figure 1:
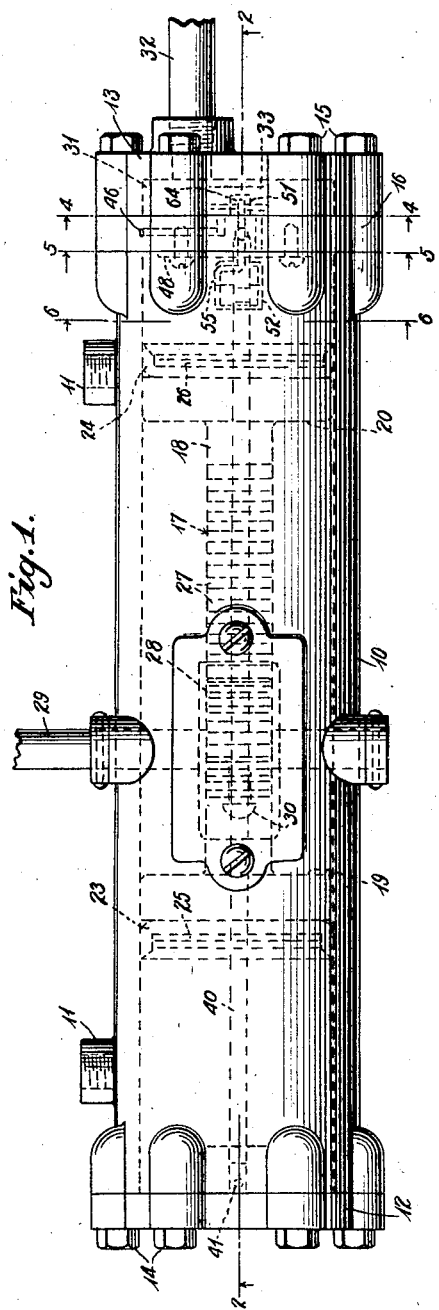
Figure 1 is a plan view of the improved motor.

Referring specifically to the drawings, wherein like reference characters designate like or similar parts, 10 designates a cylinder which is adapted for stationary mounting as on an automobile windshield or the like, to which end the cylinder is provided with attaching bosses 11. At opposite ends, the cylinder is closed by means of plates 12 and 13, secured to the cylinder by means of bolts or screws 14 and 15. Removably secured between the cylinder and plate 13 by passage of the bolts 15 therethrough, is a mounting plate 16 with which the controlling parts of the motor are associated. Reciprocable within the cylinder 10, is a piston generally designated 17, the same comprising a bar 18 and heads 19 and 20 at opposite ends thereof. Detachably fastened to the heads 19 and 20 as by means of bolts or screws 21 and 22, are cup-shaped washers 23 and 24 of leather, rubber or the like, metallic disks 25 and 26 serving to maintain the shape of the washers.

The bar 18 is, in effect, a rack bar, since it is provided with teeth at 27. Meshing with said teeth 27, is a mutilated gear wheel 28 which is fastened rigidly to a shaft 29 as by means of a screw 30. Said shaft 29 is journaled in the wall of casing 10 and is the power take-off shaft of the motor, being designed, for instance, to operate or oscillate a windshield wiper (not shown).

The plate 13 is of cup shape so that it will provide a chest or space 31 for the air, steam or other operating fluid, which may be admitted from any suitable source of supply through a pipe 32 eccentrically screwed or otherwise connected to the closure 13.

Vertically reciprocable within the chest 13 and in intimate contact with the adjacent face of plate 16 is a valve 33 which may have positioning springs 34 fastened thereto and expansively wiping the closure 13. Extending transversely through the valve plate 33 are inlet ports 35 and 36 respectively, adjacent the top and bottom thereof, which are adapted to register at times with inlet ports 37 and 38 provided through the plate 16. Registration of ports 35 and 37 enables admission of operating fluid to the right-hand end of the cylinder, while registration of the ports 36 and 38 enables admission of the operating fluid to the left-hand end of the cylinder 10 inasmuch as port 38 communicates with a passage-way 39 in plate 16, a pipe or conduit 40 fastened to the cylinder and a passage-way 41 provided in the cylinder and communicating with the pipe 40 and left-hand end of the cylinder. Since the passageways 39 and 41 are provided by drilling, their entrances are suitably closed as by means of screw plugs 42 and 43, respectively.

The exhaust of spent power fluid from the right-hand end of the cylinder takes place through the port 37, a transverse passage or groove 44 in the valve plate 33, a transverse port 45 in the mounting plate 16 and therefrom through a lateral passage-way 46 to the atmosphere, while exhaust of spent fluid from the opposite end of the cylinder takes place through the passage-way 41, pipe 40, passage-way 39, port 38, a transverse groove or passage-way 45 in the valve plate 33, a port 46 in the mounting plate and therefrom through a lateral passage-way 47 to the atmosphere.

A suitable toggle means is primarily mounted by plate 16 and operable by the piston 17 to control the inlet and exhaust of power fluid through the reciprocation of valve 33 and registration of the ports described in proper sequence. To this end, a bracket 48, as detailed in Figure 7, is screwed as at 49 to the plate 16 and located interiorly of the cylinder, a portion of such plate being cut-away or slotted as at 49 and registering with slots at 50 and 51 provided in the plate 16 and valve 33, respectively. Bracket 48 also has ears 52 provided with inwardly extending lugs 53 and 54 at top and bottom thereof, the former being closer to plate 16 than the latter. The toggle comprises an upper section 55 as detailed in Figure 8, and a lower section 56 as detailed in Figure 9. Toggle section 55 is generally of U-shape, having legs 57 provided with notches 58 in the lower edges which engage and fulcrum on the lugs 53 while the toggle section 56 is also U-shaped, having side legs 59 provided with notches 60 in their upper ends, which engage and fulcrum on the said lugs 53. A contractile coil spring 61 holds the toggle sections in engagement with lugs 53 and prevents separation thereof, being connected to reduced portions 62 and 63 at the bridges of said toggle sections.

Said toggle section 55 has a valve operating arm 64 which extends through the slots 49, 50 and 51 and in the latter, at a slot 65, engages a pin 66 carried by the valve plate 33.

In order to actuate the toggle, a rod 67 is connected pivotally or loosely, to the reduced portion 63, such arm being carried by the piston 17 and adapted for sliding movement relatively thereto, the same passing loosely through slots 68 and 69 provided in the cup 24 and disk 26 and having end lugs 70 within a recess 71 of the piston, which lugs are adapted for engagement by the end wall of recess 71 in order to throw the lower toggle section to the right and for engagement with the disk 26 to throw the same toggle section to the left, thus causing vertical oscillation of arm 64 and movement of the valve 33, the spring 61 incidental to movement of the toggle sections moving from one side of dead center to the other, so that the toggle will be maintained by the spring 61 in either position thereof.

Figure 2:
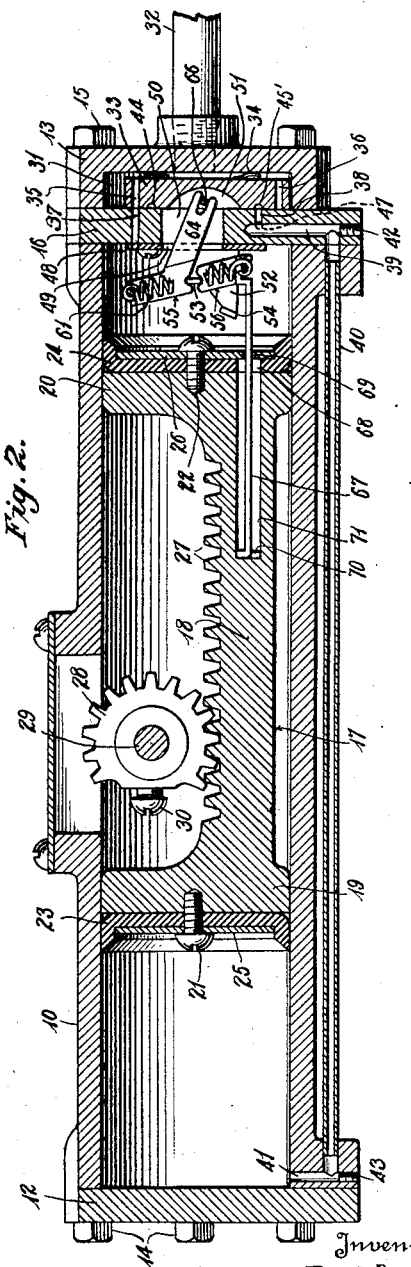
Figure 2 is a longitudinal sectional view thereof taken on the line 2—2 of Figure 1.

Presuming operation, with the parts shown as in Figure 2, power fluid is exhausting from the left-hand end of the cylinder through the passage-way 41, pipe 40 and passage-ways 39, 38, 45', 46 and 47 while power fluid will pass from the chest 31 to the right-hand end of the cylinder, thus moving the piston to the left, entering through ports 35 and 37. In said Figure 2, the piston is shown at its extreme of right-hand movement, wherein the toggle has been shifted through sliding movement of arm 67, caused by abutment of the piston therewith. Said piston adjacent the end of its left-hand movement, by abutment of disk 26 with lugs 70, pulls the bar 67 therewith which moves the toggle section 56 to the left to the extent permitted by lugs 54, the spring 61 moving past dead center and tilting arm 64 upwardly and thus shifting valve plate 33 to its uppermost position in which the power fluid will be admitted into the left-hand end of the cylinder through the port 36, passage-ways 38 and 39, pipe 40 and passage-way 41. At the same time, the exhaust from the right-hand end of the cylinder occurs through port 37, and passage-ways 33, 45 and 46 to the atmosphere. In this manner, the piston is successively reciprocated and corresponding motion is transmitted to the shaft 29 through the engagement of gear wheel 28 with the teeth 27.

Various changes may be resorted to within the spirit and scope of the invention as defined by appended claims.

I claim:

1. A motor of the class described having a cylinder, a piston operable therein, a mounting plate, an end closure for the cylinder separable from the plate and hollow at its inner side to provide a chest for power fluid, means detachably securing the end plate and mounting plate to the cylinder, said mounting plate having inlet and exhaust passages communicating with opposite sides of the cylinder, a valve operable in said chest having inlet and exhaust passages to register with the first mentioned passages, toggle means mounted on the plate on the opposite side thereof to the valve, a pin on said valve, an arm extending from the toggle means through the plate having a bifurcated end straddling said pin; to actuate the valve, and an operative connection between the piston and toggle means to actuate the latter.

2. In a motor of the class described, a cylinder, a piston operable therein, a plate at one end of the cylinder having inlet and exhaust passages for communication with opposite sides of the piston, a valve operable against one side of the plate to control the exhaust and admission of power fluid therethrough, an end closure about said valve providing a chest for power fluid, a bracket on the opposite side of said plate to said valve, said bracket having upper and lower lugs, toggle sections fulcrumed on the upper lugs, a spring connecting the toggle sections and maintaining them in operative relation, an arm extending from one of the toggle sections through the plate and connected to the valve to actuate the latter, an arm operatively connected to one of the toggle sections mounted by the piston for sliding movement independently thereof said plate and closure being separable, means securing the plate and closure to the cylinder, and means whereby the piston will operate said arm in different directions at its two extremes of movement, the lower lugs serving to limit movement of the toggle in one direction.

3. A motor of the class described having a cylinder, a piston operable therein, a plate carried by the cylinder having inlet and exhaust ports therethrough, a closure beyond the plate providing a chest for power fluid on the side of the plate opposite the piston, said plate having an opening therethrough, a bracket carried by the plate having an opening in registry with the first mentioned opening, said bracket having ears extending toward the piston, upper and lower lugs on said ears, one set of lugs being nearer the piston than the other set of lugs, toggle members generally of U-shape having engagement with the opposite sides of the set of lugs furtherest from the piston, spring means connecting said toggle members, an arm extending from one of the toggle members and through said openings, a valve operable in said chest engaged and actuated by said arm, the toggle members being aligned in one position and at an angle with respect to the path of movement of the valve, said toggle members being aligned and at the reverse angle to said path of movement in the other position of the valve, the lugs nearest the piston limiting the movement of the toggle members to the latter position, and means whereby the toggle members are actuated through operation of the piston.

FRED DOVE.